(12) United States Patent
Yasutomi

(10) Patent No.: US 6,343,613 B1
(45) Date of Patent: Feb. 5, 2002

(54) PORTABLE AND COLLAPSIBLE SLEEPER APPARATUS

(76) Inventor: George Y. Yasutomi, 4496 Linden Ave., Long Beach, CA (US) 90807

( * ) Notice: Subject to any disclaimer, the term of this patent is extended or adjusted under 35 U.S.C. 154(b) by 0 days.

(21) Appl. No.: 09/687,086

(22) Filed: Oct. 13, 2000

(51) Int. Cl.[7] ............................................ E04H 15/06
(52) U.S. Cl. .............................. 135/88.01; 135/88.13; 135/129; 296/105
(58) Field of Search .................... 135/88.01, 88.13, 135/88.07, 88.14, 129, 131; 296/100, 105, 100.18

(56) References Cited

U.S. PATENT DOCUMENTS

| | | | |
|---|---|---|---|
| 3,582,129 A | 6/1971 | Frank | |
| 4,121,684 A | 10/1978 | Stephens et al. | |
| D282,920 S | 3/1986 | Eggan | |
| 4,711,484 A * | 12/1987 | Tuerk | 296/105 |
| 4,844,109 A * | 7/1989 | Navarro | 135/88.01 |
| 4,848,827 A * | 7/1989 | Ou | 135/88.01 |
| 4,883,307 A | 11/1989 | Hacker et al. | |
| 4,918,772 A | 4/1990 | Hailie | |
| 5,007,672 A * | 4/1991 | Koch | 296/100 |
| 5,080,423 A * | 1/1992 | Merlot | 296/105 |
| 5,253,914 A * | 10/1993 | Biancale | 296/105 |
| 5,338,084 A * | 8/1994 | Wardell | 296/105 |
| 5,524,953 A * | 6/1996 | Shaer | 296/100 |
| 5,538,313 A * | 7/1996 | Henning | 296/105 |
| 5,546,972 A * | 8/1996 | Wardell | 135/129 |
| 5,658,038 A | 8/1997 | Griffin | |
| 5,692,793 A * | 12/1997 | Wlson | 296/100 |
| 5,839,462 A * | 11/1998 | Randall | 135/128 |
| 6,183,036 B1 * | 2/2001 | Coulson | 296/105 |
| 6,257,260 B1 * | 7/2001 | Phillips | 135/88.13 |

* cited by examiner

Primary Examiner—Beth A. Stephan

(57) ABSTRACT

A portable and collapsible sleeper apparatus for providing a comfortable and protective space for truck drivers to sleep when the truck doesn't have a conventional sleeper. The portable and collapsible sleeper apparatus includes a track assembly including first and second elongate track members being spaced apart and having first and second ends; and also includes a cover support assembly including a first support member being attached to the first ends of the first and second elongate track member, and also includes a second support member being movably mounted upon the first and second elongate track members; and further includes a cover assembly including a cover member having first and second ends and being securely attached to the first and second support members; and also includes a crank assembly being movably mounted upon the first and second elongate track members.

13 Claims, 7 Drawing Sheets

US 6,343,613 B1

PORTABLE AND COLLAPSIBLE SLEEPER APPARATUS

BACKGROUND OF THE INVENTION

1. Field of the Invention

The present invention relates to a collapsible sleeper for flatbed trailers and more particularly pertains to a new portable and collapsible sleeper apparatus for providing a comfortable and protective space for truck drivers to sleep when the truck doesn't have a conventional sleeper.

2. Description of the Prior Art

The use of a collapsible sleeper for flatbed trailers is known in the prior art. More specifically, a collapsible sleeper for flatbed trailers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,918,772; 4,883,307; 4,121,684; 5,658,038; U.S. Pat. No. Des. 282,920; and U.S. Pat. No. 3,582,129.

While these devices fulfill their respective, particular objectives and requirements, the aforementioned patents do not disclose a new portable and collapsible sleeper apparatus. The inventive device includes a track assembly including first and second elongate track members being spaced apart and having first and second ends; and also includes a cover support assembly including a first support member being attached to the first ends of the first and second elongate track member, and also includes a second support member being movably mounted upon the first and second elongate track members; and further includes a cover assembly including a cover member having first and second ends and being securely attached to the first and second support members; and also includes a crank assembly being movably mounted upon the first and second elongate track members.

In these respects, the portable and collapsible sleeper apparatus according to the present invention substantially departs from the conventional concepts and designs of the prior art, and in so doing provides an apparatus primarily developed for the purpose of providing a comfortable and protective space for truck drivers to sleep when the truck doesn't have a conventional sleeper.

SUMMARY OF THE INVENTION

In view of the foregoing disadvantages inherent in the known types of collapsible sleeper for flatbed trailers now present in the prior art, the present invention provides a new portable and collapsible sleeper apparatus construction wherein the same can be utilized for providing a comfortable and protective space for truck drivers to sleep when the truck doesn't have a conventional sleeper.

The general purpose of the present invention, which will be described subsequently in greater detail, is to provide a new portable and collapsible sleeper apparatus which has many of the advantages of the collapsible sleeper for flatbed trailers mentioned heretofore and many novel features that result in a new portable and collapsible sleeper apparatus which is not anticipated, rendered obvious, suggested, or even implied by any of the prior art collapsible sleeper for flatbed trailers, either alone or in any combination thereof.

To attain this, the present invention generally comprises a track assembly including first and second elongate track members being spaced apart and having first and second ends; and also includes a cover support assembly including a first support member being attached to the first ends of the first and second elongate track member, and also includes a second support member being movably mounted upon the first and second elongate track members; and further includes a cover assembly including a cover member having first and second ends and being securely attached to the first and second support members; and also includes a crank assembly being movably mounted upon the first and second elongate track members.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new portable and collapsible sleeper apparatus which has many of the advantages of the collapsible sleeper for flatbed trailers mentioned heretofore and many novel features that result in a new portable and collapsible sleeper apparatus which is not anticipated, rendered obvious, suggested, or even implied by any of the prior art collapsible sleeper for flatbed trailers, either alone or in any combination thereof.

It is another object of the present invention to provide a new portable and collapsible sleeper apparatus which may be easily and efficiently manufactured and marketed.

It is a further object of the present invention to provide a new portable and collapsible sleeper apparatus which is of a durable and reliable construction.

An even further object of the present invention is to provide a new portable and collapsible sleeper apparatus which is susceptible of a low cost of manufacture with regard to both materials and labor, and which accordingly is then susceptible of low prices of sale to the consuming public, thereby making such portable and collapsible sleeper apparatus economically available to the buying public.

Still yet another object of the present invention is to provide a new portable and collapsible sleeper apparatus which provides in the apparatuses and methods of the prior art some of the advantages thereof, while simultaneously overcoming some of the disadvantages normally associated therewith.

Still another object of the present invention is to provide a new portable and collapsible sleeper apparatus for providing a comfortable and protective space for truck drivers to sleep when the truck doesn't have a conventional sleeper.

Yet another object of the present invention is to provide a new portable and collapsible sleeper apparatus which includes a track assembly including first and second elongate track members being spaced apart and having first and second ends; and also includes a cover support assembly including a first support member being attached to the first ends of the first and second elongate track member, and also includes a second support member being movably mounted upon the first and second elongate track members; and further includes a cover assembly including a cover member having first and second ends and being securely attached to the first and second support members; and also includes a crank assembly being movably mounted upon the first and second elongate track members.

Still yet another object of the present invention is to provide a new portable and collapsible sleeper apparatus that is easy and convenient to set up and take down by the user.

Even still another object of the present invention is to provide a new portable and collapsible sleeper apparatus that eliminates the trucker from having to sleep on the truck seat in a cramped position.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
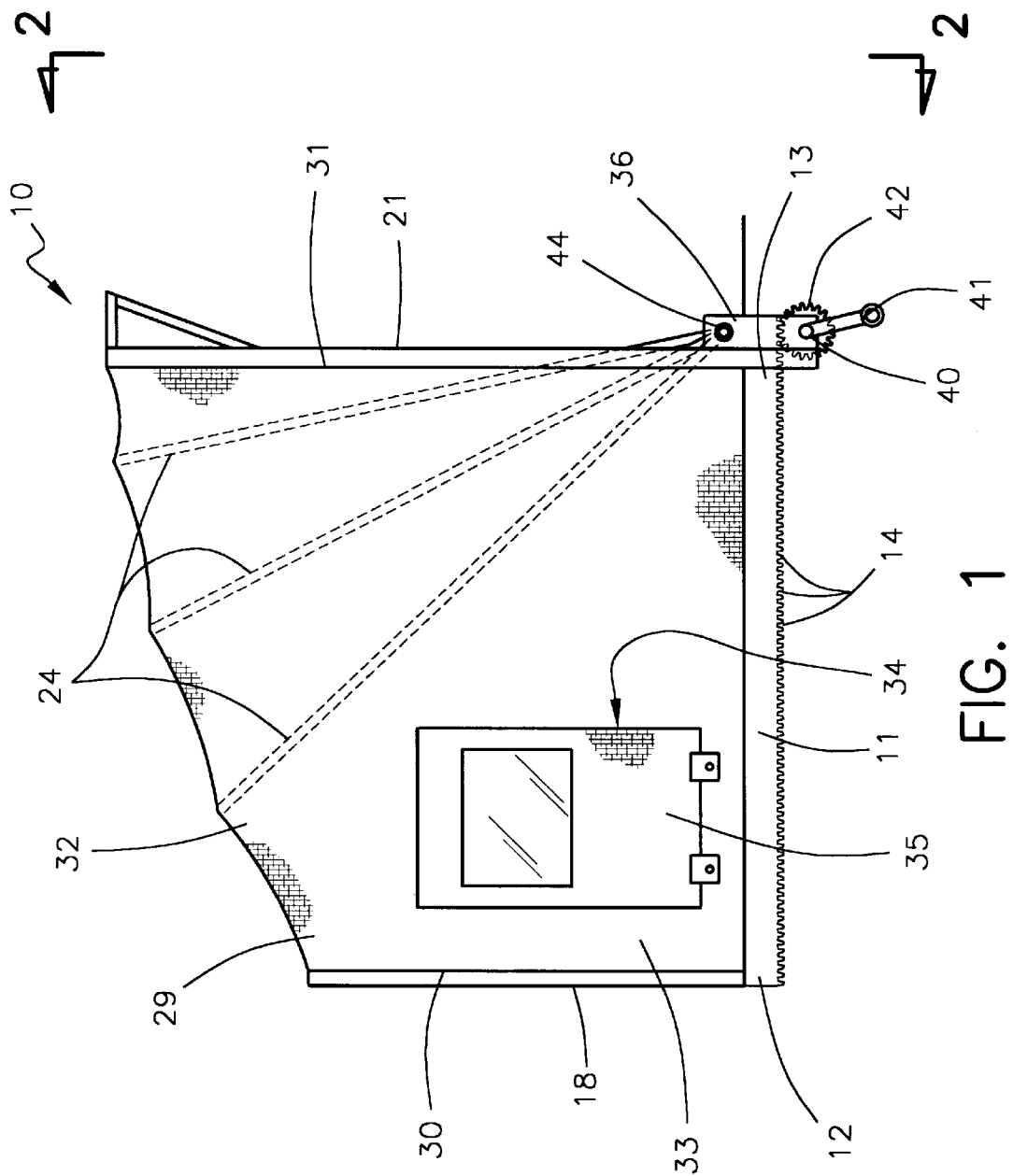
FIG. 1 is a side elevational view of a first embodiment of a new portable and collapsible sleeper apparatus according to the present invention and being shown in a closed position.
Figure 2:
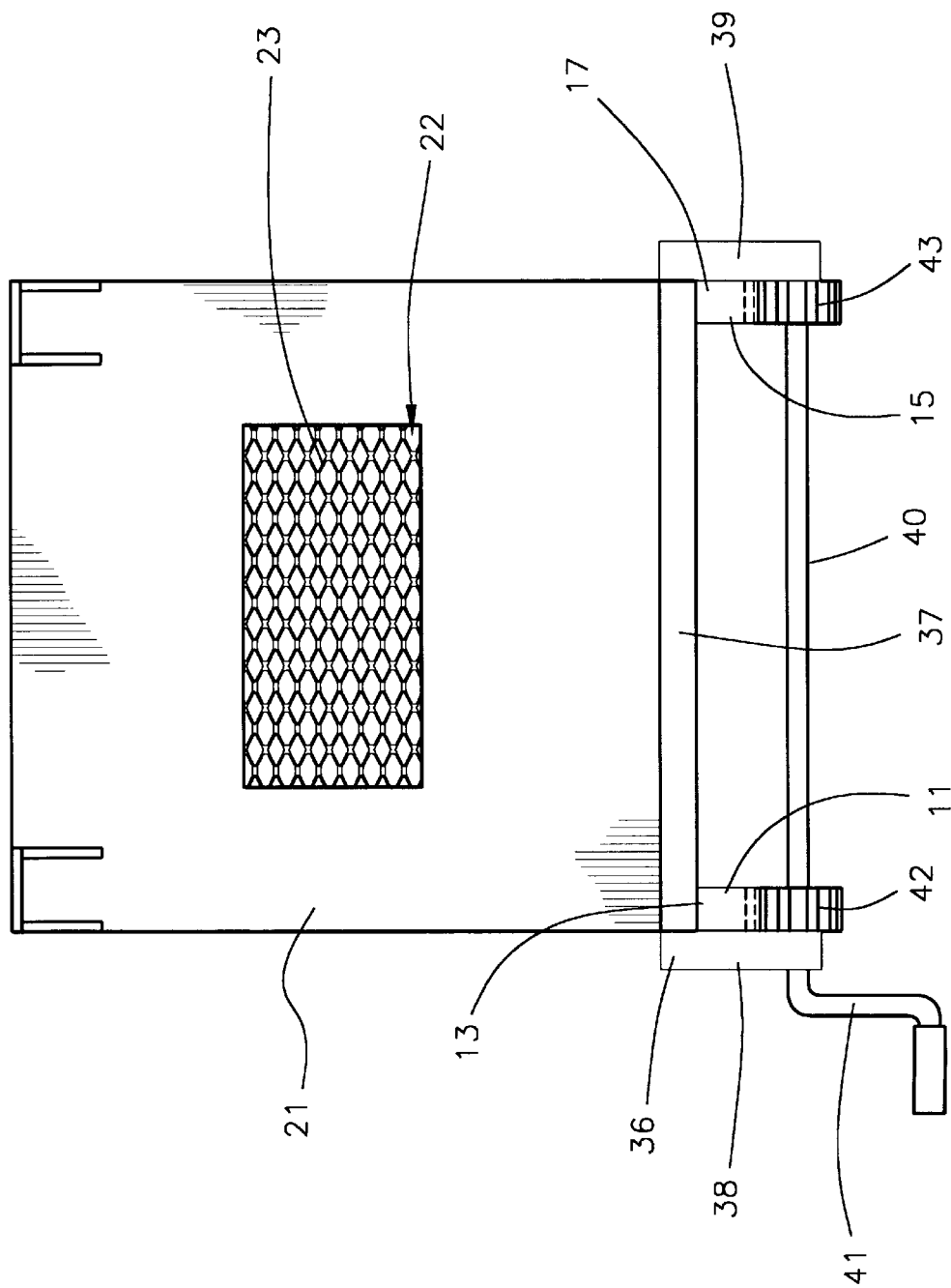
FIG. 2 is an end elevational view of the first embodiment of the present invention.
Figure 3:
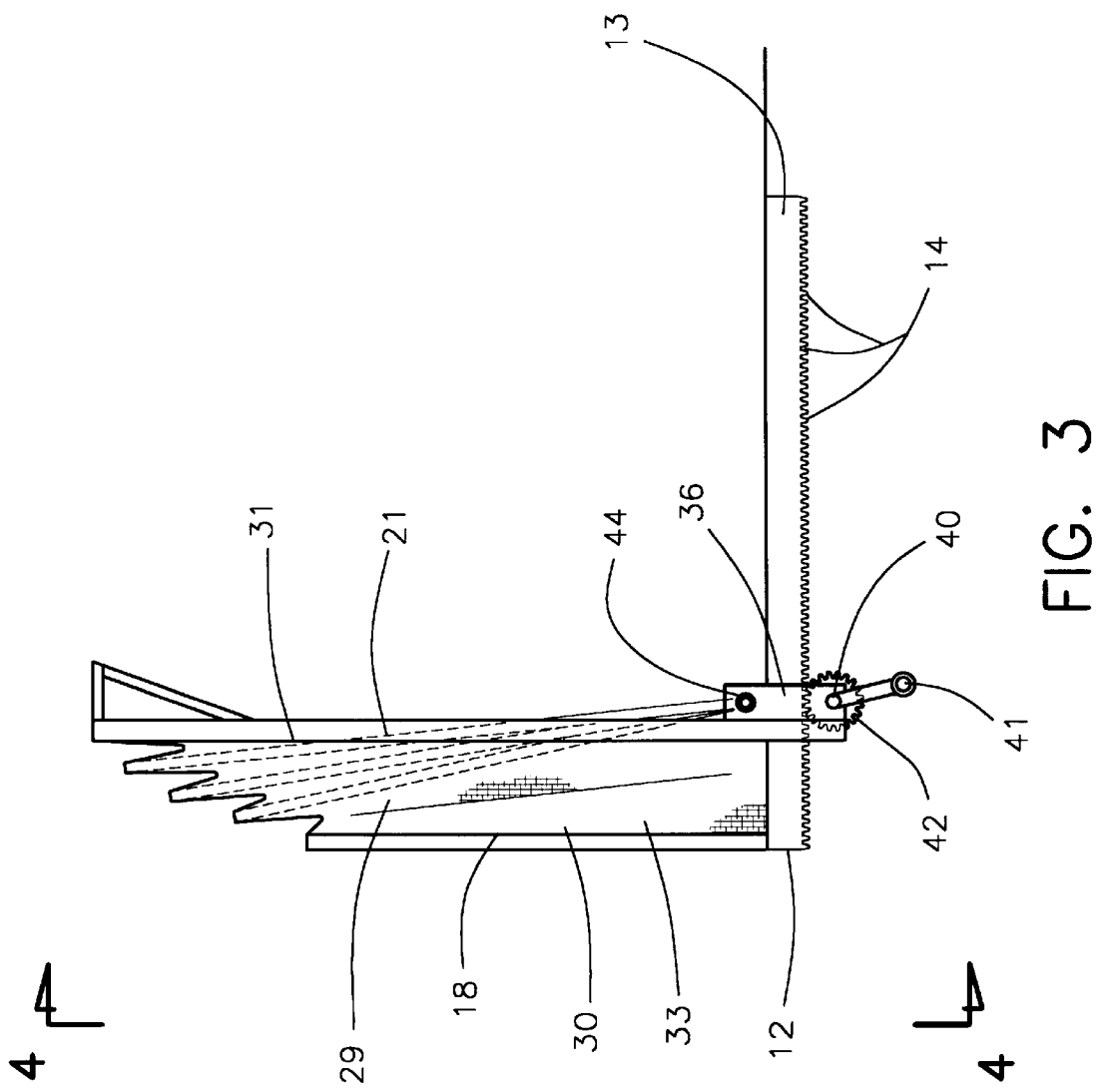
FIG. 3 is a side elevational view of the first embodiment of the present invention shown in the open position.
Figure 4:
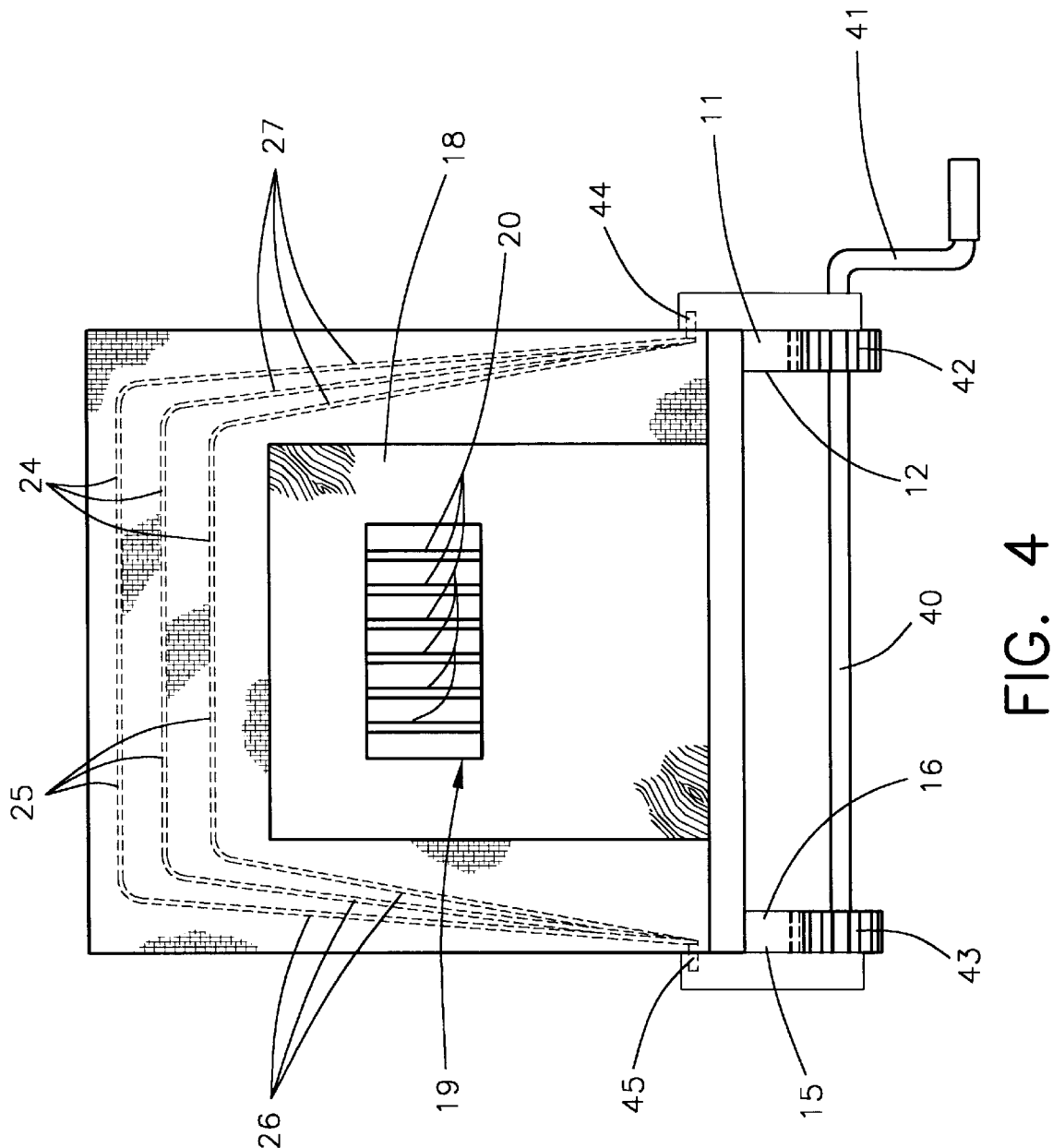
FIG. 4 is another end elevational view of the first embodiment of the present invention.
Figure 5:
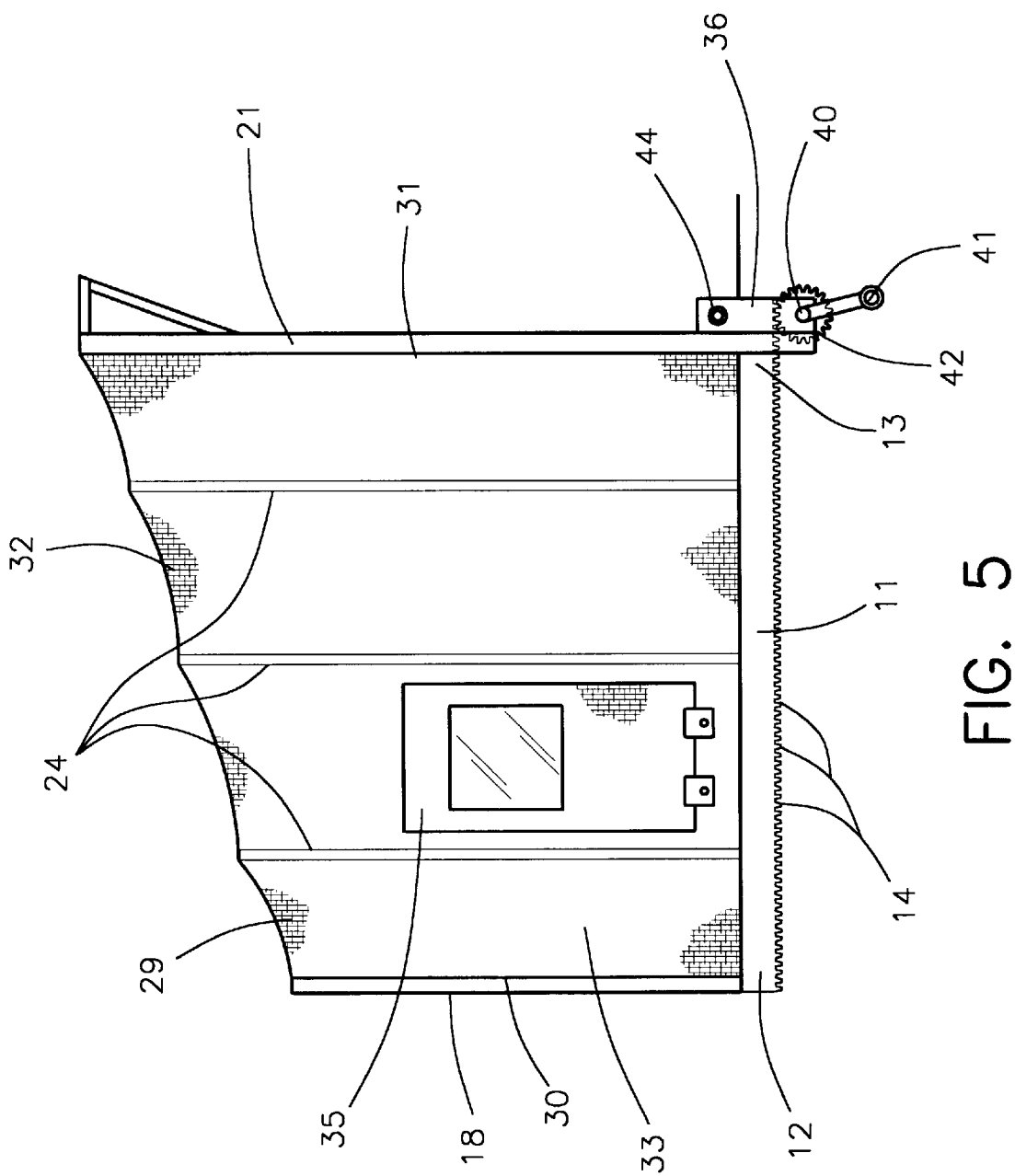
FIG. 5 is a side elevational view of a second embodiment of the present invention.
Figure 6:
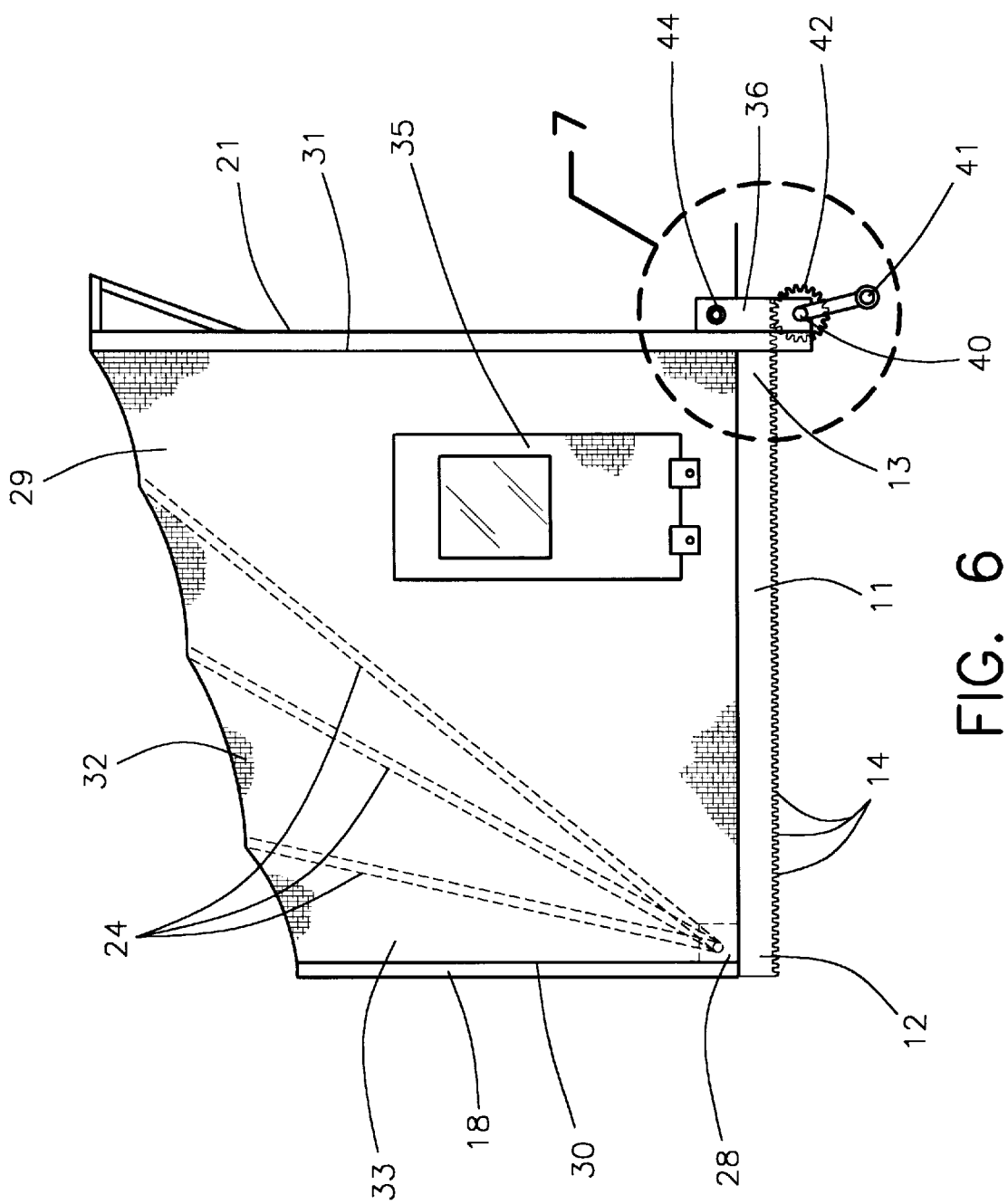
FIG. 6 is a side elevational view of the second embodiment of the present invention.
Figure 8:
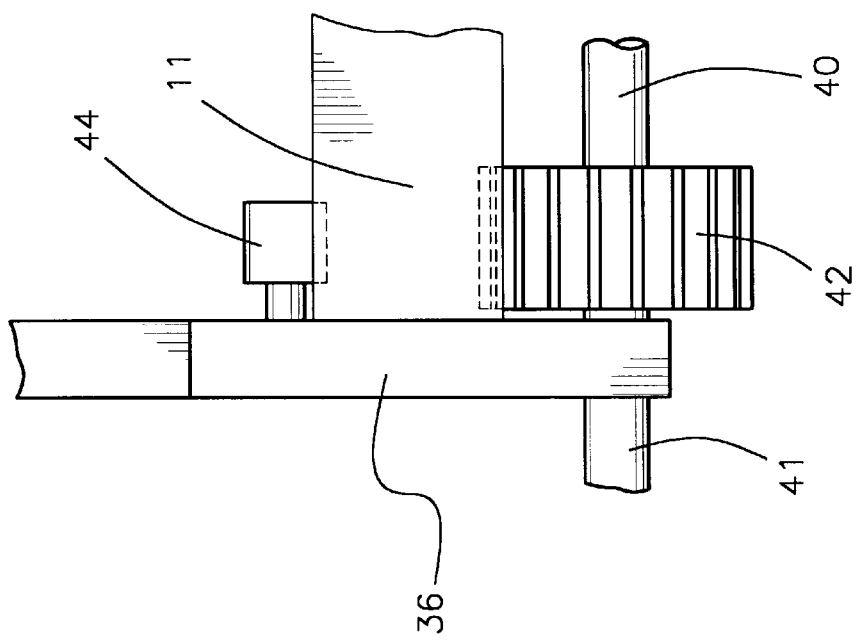
FIG. 8 is a detailed partial end elevational view of the track and crank assembly of the present invention.
Figure 7:
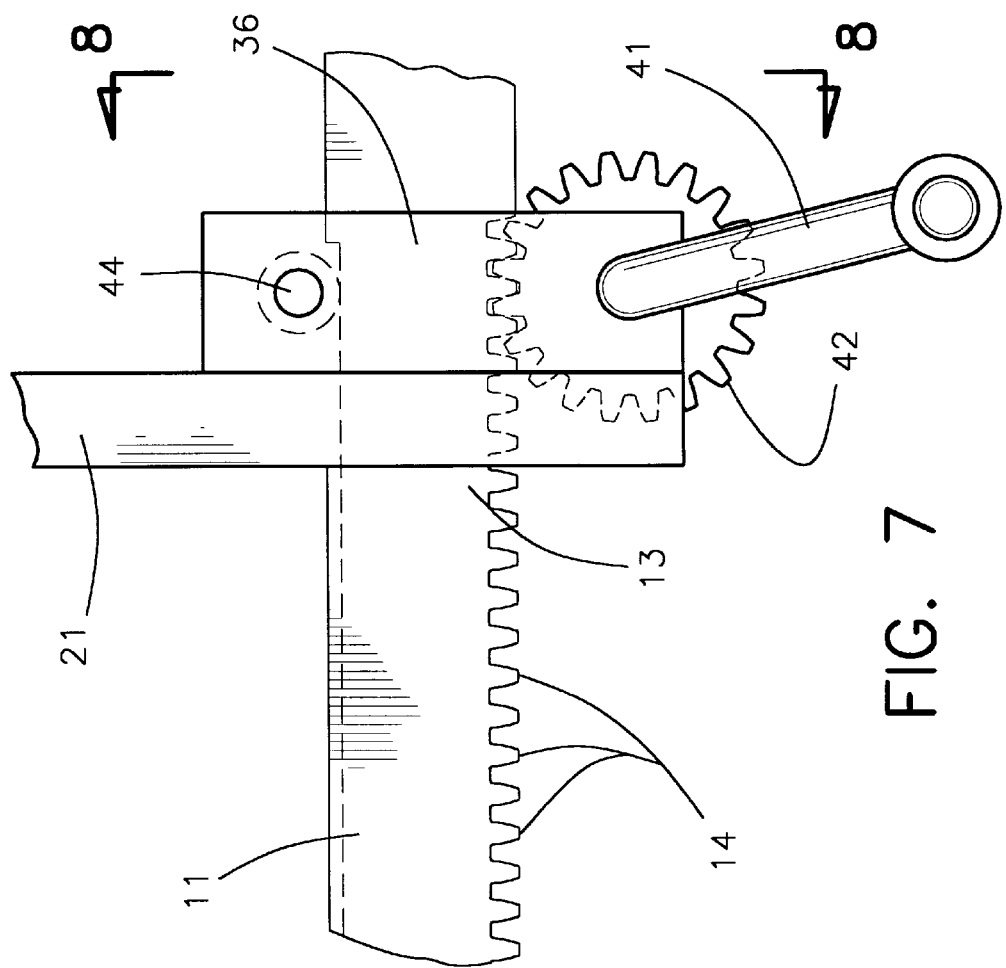
FIG. 7 is a detailed partial side elevational view of the track and crank assembly of the present invention.

With reference now to the drawings, and in particular to FIGS. 1 through 8 thereof, a new portable and collapsible sleeper apparatus embodying the principles and concepts of the present invention and generally designated by the reference numeral 10 will be described.

As best illustrated in FIGS. 1 through 8, the portable and collapsible sleeper apparatus 10 generally comprises a track assembly including first and second elongate track members 11,15 being spaced apart and having first 12,16 and second 13,17 ends. Each of the first and second elongate track members 11,15 includes a plurality of teeth 14 being disposed upon and along a length thereof and is adapted to mount upon a flatbed trailer. The track members are approximately 72 inches long and are spaced approximately 96 inches apart.

A cover support assembly includes a first support member 18 being conventionally attached to the first ends 12,16 of the first and second elongate track members 11,15, and also includes a second support member 21 being movably and conventionally mounted upon the first and second elongate track members 11,15 for forming and taking down a shelter. The cover support assembly further includes a plurality of collapsible braces 24 each of which has an elongate main portion 25 and elongate end portions 26,27 being angled relative to the elongate main portion 25. Each of the collapsible braces 24 is generally a tubular member. The main portions 25 are disposed above the first and second elongate track members 11,15. The first and second support members 11,15 are generally board members which are arranged perpendicularly to the first and second elongate track members 11,15 with the board member of the second support member 21 being adapted to be disposed at a front end of the flatbed trailer. Each of the first and second support members 18,21 has an opening 19,22 disposed therethrough. Each of the openings 19,22 is covered with a protective member 20,23. The protective members 20,23 include a metal grating 23 being securely and conventionally attached over the opening 22 of the second support member 21, and also includes bars 20 being spaced apart and being securely and conventionally attached over the opening 19 of the first support member 18.

A cover assembly includes a cover member 29 having first and second ends 30,31 and being securely and conventionally attached to the first and second support members 18,21. The cover assembly also includes an opening 34 disposed through a side portion 33 of the cover member 29, and also includes a door member 35 being hingedly attached to the cover member 29 and being closeable over the opening 34 in the cover member 29. The cover member 29 has a top portion 32 which is supported upon the main portions 25 of the collapsible braces 24 to form the shelter upon the second support member 21 being moved to the second ends 13,17 of the first and second elongate track members 11,15. The cover member 29 is made of canvas material.

A crank assembly is movably mounted upon the first and second elongate track members 11,15 and includes an elongate crank support member 36 having a main portion 37 and end portions 38,39, and also includes a shaft 40 being journaled through the ends portions 38,39 of the elongate crank support member 36, and further includes a handle 41 being securely and conventionally attached to an end of the shaft 40, and also includes first and second pinion gears 42,43 being conventionally mounted about the shaft 40 and being engagable to the teeth 14 of the first and second elongate track members 11,15, and further includes rollers 44,45 being journaled to the elongate crank support member 36 and being engagable to the first and second elongate track members 11,15.

As a first embodiment, the elongate end portions 26,27 of the collapsible braces 24 are pivotally attached to the elongate crank support member 36.

As a second embodiment, the elongate end portions 26,27 of the collapsible braces 24 are pivotally attached to brackets 28 which are securely and conventionally attached to the first support member 18.

As a third embodiment, the elongate end portions 26,27 of the collapsible braces 24 are movably and conventionally attached along the first and second elongate track members 11,15.

In use, the user turns the handle 41 which moves the pinion gears 42,43 and the second support member 21 along the track members 11,15 to either set up the shelter upon the second support member 21 being moved to the second ends 13,17 of the track members 11,15 or take down the shelter upon the second support member 21 being moved to the first ends 12,16 of the track members 11,15.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable and collapsible sleeper apparatus comprising:
    a track assembly including first and second elongate track members being spaced apart and having first and second ends;
    a cover support assembly including a first support member being attached to said first ends of said first and second elongate track members, and also including a second support member being movably mounted upon said first and second elongate track members for forming and taking down a shelter;
    a cover assembly including a cover member having first and second ends and being securely attached to said first and second support members; and
    a crank assembly being movably mounted upon said first and second elongate track members.

2. A portable and collapsible sleeper apparatus as described in claim 1, wherein each of said first and second elongate track members includes a plurality of teeth being disposed upon and along a length thereof and is adapted to mount upon a flatbed trailer.

3. A portable and collapsible sleeper apparatus as described in claim 2, wherein said cover support assembly further includes a plurality of collapsible braces each of which has an elongate main portion and elongate end portions being angled relative to said elongate main portion, each of said collapsible braces being generally tubular members, said main portions being disposed above said first and second elongate track members.

4. A portable and collapsible sleeper apparatus as described in claim 3, wherein said first and second support members are generally board members which are arranged generally perpendicular to said track members with said board member of said second support member being adapted to be disposed at a front end of the flatbed trailer.

5. A portable and collapsible sleeper apparatus as described in claim 4, wherein each of said first and second support members has an opening disposed therethrough, each of said openings being covered with a protective member.

6. A portable and collapsible sleeper apparatus as described in claim 5, wherein said cover assembly also includes an opening disposed through a side portion of said cover member, and also includes a door member being hingedly attached to said cover member and being closeable over said opening in said cover member, said cover member having a top portion which is supported upon said main portions of said collapsible braces to form said shelter upon said second support member being moved to said second ends of said first and second elongate track members.

7. A portable and collapsible sleeper apparatus as described in claim 6, wherein said crank assembly includes an elongate crank support member having a main portion and end portions, and also includes a shaft being journaled through said ends portions of said elongate crank support member, and further includes a handle being securely attached to an end of said shaft, and also includes first and second pinion gears being mounted about said shaft and being engagable to said teeth of said first and second elongate track members, and further includes rollers being journaled to said elongate crank support member and being engagable to said first and second elongate track members.

8. A portable and collapsible sleeper apparatus as described in claim 7, wherein said cover member is made of canvas material.

9. A portable and collapsible sleeper apparatus as described in claim 8, wherein said protective member includes a metal grating being securely attached over said opening of said second support member, and also includes bars being spaced apart and being securely attached over said opening of said first support member.

10. A portable and collapsible sleeper apparatus as described in claim 9, wherein said elongate end portions of said collapsible braces being pivotally attached to said elongate crank support member.

11. A portable and collapsible sleeper apparatus as described in claim 9, wherein said elongate end portions of said collapsible braces are pivotally attached to brackets which are securely attached to said first support member.

12. A portable and collapsible sleeper apparatus as described in claim 9, wherein said elongate end portions of said collapsible braces movably attached along said first and second elongate track members.

13. A portable and collapsible sleeper apparatus comprising:
    a track assembly including first and second elongate track members being spaced apart and having first and second ends, each of said first and second elongate track members including a plurality of teeth being disposed upon and along a length thereof and is adapted to mount upon a flatbed trailer, said track members being approximately 72 inches long and being spaced approximately 96 inches apart;

a cover support assembly including a first support member being attached to said first ends of said first and second elongate track members, and also including a second support member being movably mounted upon said first and second elongate track members for setting up and taking down a shelter, said cover support assembly further including a plurality of collapsible braces each of which has an elongate main portion and elongate end portions being angled relative to said elongate main portion, each of said collapsible braces being generally tubular members, said main portions being disposed above said first and second elongate track members, said first and second support members being generally board members which are arranged perpendicularly to said track members with said board member of said second support member being adapted to be disposed at a front end of the flatbed trailer, each of said first and second support members having an opening disposed therethrough, each of said openings being covered with a protective member, said protective members including a metal grating being securely attached over said opening of said second support member, and also including bars being spaced apart and being securely attached over said opening of said first support member;

a cover assembly including a cover member having first and second ends and being securely attached to said first and second support members, said cover assembly also including an opening disposed through a side portion of said cover member, and also including a door member being hingedly attached to said cover member and being closeable over said opening in said cover member, said cover member having a top portion which is supported upon said main portions of said collapsible braces to form said shelter upon said second support member being moved to said second ends of said first and second elongate track members, said cover member being made of canvas material; and a crank assembly being movably mounted upon said first and second elongate track members, said crank assembly including an elongate crank support member having a main portion and end portions, and also including a shaft being journaled through said ends portions of said elongate crank support member, and further including a handle being securely attached to an end of said shaft, and also including first and second pinion gears being mounted about said shaft and being engagable to said teeth of said first and second elongate track members, and further including rollers being journaled to said elongate crank support member and being engagable to said first and second elongate track members, said elongate end portions of said collapsible braces being pivotally attached to said elongate crank support member.

* * * * *